D. L. POWERS.
HARROW.
APPLICATION FILED JUNE 19, 1909.
974,427.
Patented Nov. 1, 1910.
2 SHEETS—SHEET 2.
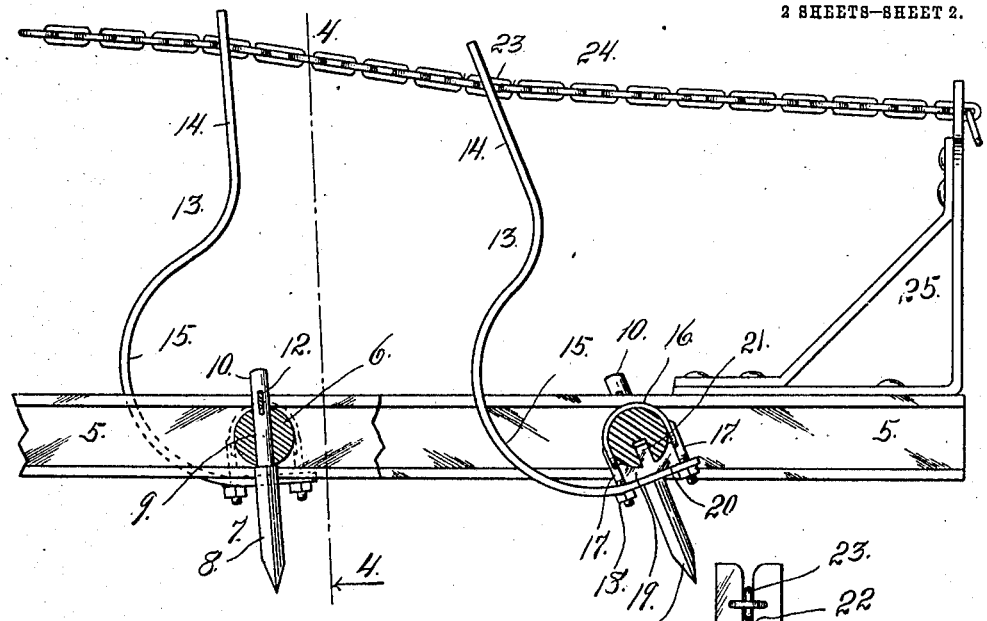
Fig. 3
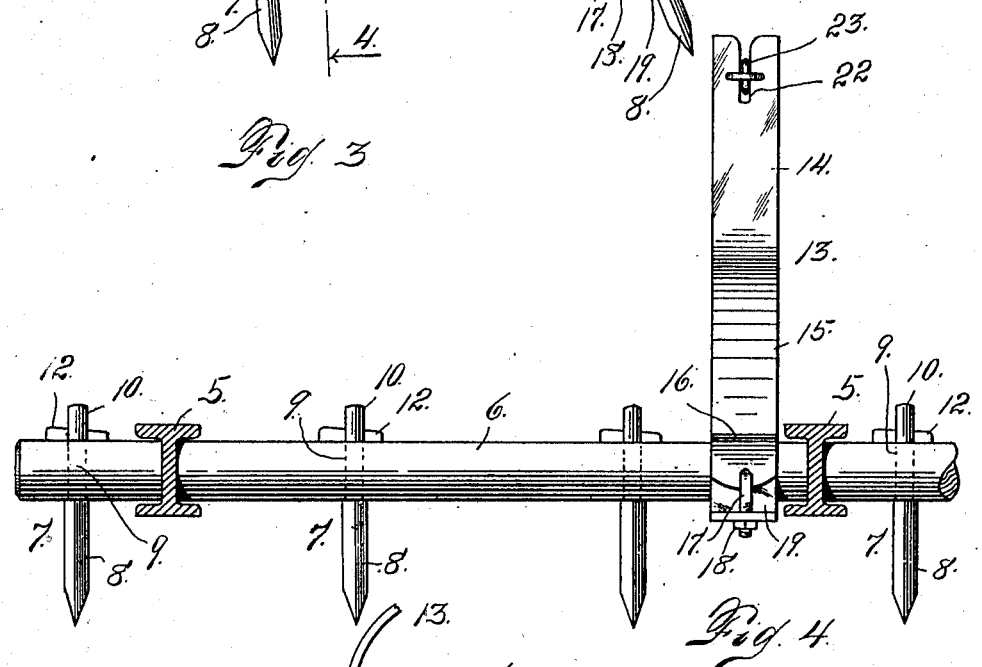
Fig. 4
Fig. 5
Witnesses
Otto E Haddick
J. D. Thornburgh
Inventor
Daniel L. Powers.
By A. J. O'Brien.
Attorney

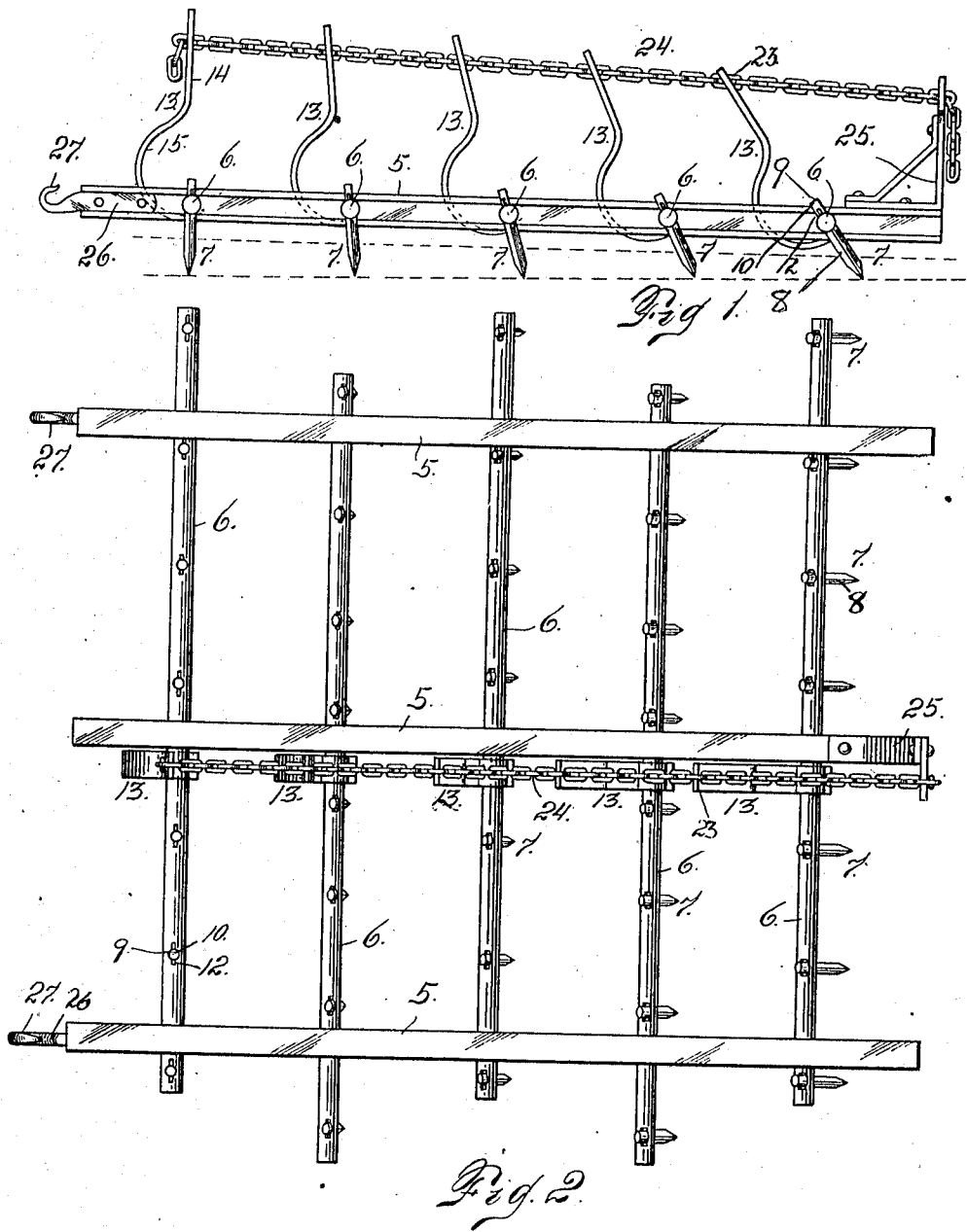

UNITED STATES PATENT OFFICE.

DANIEL L. POWERS, OF EVANS, COLORADO.

HARROW.

974,427.

Specification of Letters Patent.

Patented Nov. 1, 1910.

Application filed June 19, 1909. Serial No. 503,184.

*To all whom it may concern:*

Be it known that I, DANIEL L. POWERS, a citizen of the United States, residing at the town of Evans, county of Weld, and State of Colorado, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in harrows of the class in which shafts are adjustably mounted upon a suitable frame work, the said shafts being equipped with teeth which are stationary in the shafts and adapted to enter the earth for pulverizing purposes. Heretofore, in this class of harrows, so far as I am aware, it is possible to adjust the shafts for the purpose of changing the inclination of the teeth, by changing all of the shafts simultaneously, and causing them all to occupy the same position, or so that all of the teeth are in the same position, whether vertical or inclined.

The object of my improved construction is to provide a simple and convenient means of adjusting these shafts independently of each other, and whereby their teeth may be caused to stand at different inclinations. In adjusting the teeth-carrying-shafts, I prefer that the shaft occupying the foremost position, shall have its teeth vertical, while the teeth of the next shaft in the rear shall be slightly inclined and the teeth of the other shafts toward the rear inclined to a greater degree, the teeth of the rearmost shaft having the greatest degree of inclination, and the degree of the inclination of the teeth of the other shafts gradually diminishing in inclination, those of the foremost shaft occupying the vertical position, as heretofore explained. There is an important advantage in an arrangement of this character, since the teeth of the foremost shaft stir up the ground to the required depth, being that of the length of the teeth, since the latter occupy the vertical position. By reason of the teeth of the rear shafts being inclined, whereby their points shall occupy the rearmost position, the said teeth are adapted to act with a crushing force upon the clods of earth, whereby the latter are broken up and pulverized. This result cannot be accomplished by the teeth when occupying the vertical position, since the teeth would simply push the clods aside instead of crushing them.

With my improved construction, I employ a series of spring members, corresponding in number to the toothed shafts of the harrow, the lower extremity of each spring member being rigidly connected with a shaft of the harrow. The upper extremities of these spring members are connected by a chain, the members having open slots of sufficient width to receive a link of the chain. As the links of the chain occupy positions at right angles to each other, the links on the opposite sides of the vertical link engaging the slot of any spring member lock the said member in the desired position of adjustment. Any other suitable device may be employed for this purpose, although the chain is preferred since it is flexible, thoroughly practicable, readily available and can be supplied at comparatively small cost.

Having briefly outlined my improved construction, I will proceed to describe same in detail, reference being made to the accompanying drawing, in which is illustrated an embodiment thereof.

In this drawing: Figure 1 is a side elevation of my improved harrow. Fig. 2 is a top plan view of the same. Fig. 3 is a fragmentary, sectional view, showing two of the toothed members and the other parts coöperating therewith, but on a larger scale than in Figs. 1 and 2. Fig. 4 is a section taken on the line 4—4, Fig. 3, looking toward the left. Fig. 5 is a cross section taken through one of the toothed shafts, showing a slightly modified form of construction for attaching the spring member to the toothed shaft.

The same reference characters indicate the same parts in all the views.

Let the numeral 5 designate a number of longitudinally disposed bars, forming the frame work of the harrow, in which a number of toothed shafts 6 of the harrow are journaled. As shown in the drawing, three bars 5 are employed, while five toothed shafts are shown extending at right angles to the frame bars, and suitably spaced. Rigidly connected with each of these bars are a number of harrow teeth 7, each having a part 8 extending below the shaft, its lower extremity being pointed, whereby it is adapted to readily enter the earth for harrowing purposes. Each tooth is provided with a reduced shank 9, passing through a suitable opening formed in the shaft, the upper protruding extremity 10 of the top being slotted to receive a wedge-shaped retaining key 12. The manner of connecting these teeth with the shaft is not important, since they may be secured thereto in any suitable manner. The toothed shafts are so arranged upon the frame that the teeth of any shaft are staggered with reference to the teeth of an adjacent shaft, either in the front or rear.

Connected with the central portion of each shaft is a spring member 13, which as shown in the drawing, has an upper straight portion 14, and a lower curved part 15, the lower extremity of the curved portion, extending rearwardly and being connected with a shaft 6 by a U-bolt 16, which passes around the shaft, its threaded members 17 passing through the lower extremity of the spring member, which is provided with openings for the purpose, the U-bolt being secured by nuts 18, applied to the protruding threaded ends of the member 17. In order to lock the shaft against turning in its U-bolt, a block 19 is employed, which is flat upon its lower surface, as shown at 20, its upper surface being curved to fit the lower part of the shaft, and having a centrally, upwardly projecting tongue 21, adapted to enter a counterpart groove, formed in the shaft. This block is interposed intermediate the members 17 of the U-bolt and between the lower extremity of the spring member, and the lower part of the shaft. As each spring member is connected with its corresponding shaft in the same manner, the construction of one of these connections is the construction of all.

The upper extremity of each spring member is provided with a relatively narrow slot 22, adapted to receive a link 23 of the chain 24, the engaging link in each instance, occupying a vertical position, while the horizontally disposed links on opposite sides prevent the spring member from changing its position upon the chain. This chain engages all of the spring members 13 from front to rear. The rear extremity of the central bar 5 of the harrow is equipped with an angle bracket 25, whose upper extremity is slotted to receive a vertically disposed link of the chain, whereby the latter may be secured or fixed, after adjusting the spring members to cause the teeth of their corresponding shafts to occupy the desired position.

From the foregoing description, it will be understood that each spring member is capable of independent adjustment upon the chain 24. This adjustability is best illustrated in Fig. 1, in which the teeth of the shaft, with which the foremost spring member is connected, occupy the vertical position, while the teeth of the other shafts, extending toward the rear, gradually increase in inclination toward the rear, the rearmost tooth having the greatest inclination, or forming the greatest angle with the vertical.

The forward extremities of two of the longitudinally disposed bars 5 are equipped with draft plates 26, whose forward extremities are provided with hooks 27, with which the doubletree (not shown) or other suitable apparatus to which the draft animal may be hitched, is connected.

From the foregoing description, the use and operation of my improved harrow will be readily understood.

Before commencing the use of the harrow the toothed shafts 6 may be adjusted within the bars 5 to cause the teeth 7 to occupy any desired position, as illustrated in Fig. 1. This is accomplished by connecting one of the vertically disposed links of the chain with the foremost spring member 13, and placing the latter in such a position as to cause the teeth of the foremost bar to occupy the desired position. In Figs. 1 and 2 of the drawing the teeth of this shaft occupy the vertical position. The other spring members, from the front toward the rear, are then connected with the chain 24 in such a position that their teeth are properly tilted, as heretofore explained. After all of the shafts and their corresponding spring members are properly adjusted, the rear extremity of the chain is connected with the bracket 25, the slack of the chain being taken up and the extra links hanging downwardly in the rear of the bracket.

In the form of construction shown in Fig. 5, a modified form of the locking block 28 is employed for securing the lower extremity of the spring member 13 to the toothed shaft 6. This block 28 has its inner surface, which engages the shaft 6, toothed to prevent the slipping of the block upon the shaft or the turning of the latter within the U-bolt 16.

Having thus described my invention, what I claim is:

1. A harrow composed of a frame work, toothed shafts journaled therein, spring members connected with the respective shafts and extended upwardly therefrom, the upper extremity of each spring member being bifurcated and connected by a flexible portion with the frame work, substantially as described.

2. A harrow, comprising a frame work, a number of transversely disposed bars journaled therein and equipped with teeth, and upwardly extended members secured at their lower extremities to the said bars, and a flexible element for adjustably connecting the upper extremities of all of the said members with the frame work, substantially as described.

3. A harrow comprising a frame work, a number of toothed bars journaled therein and arranged in parallel relation, upwardly extending spring members, having their lower extremities rigidly connected with the toothed bars, and a flexible device connecting the upper extremities of all of the spring members with the frame work of the harrow, the latter being equipped with an upwardly extending bracket for the purpose, the flexible device being adjustably connected with the spring members, for the purpose set forth.

4. A harrow composed of a frame work, a number of transversely arranged toothed bars, disposed in parallel relation and journaled in the frame work, spring members connected with the respective toothed bars at the lower extremities of the said bars, the latter projecting upwardly from the said bars, the frame work being provided with a relatively stationary bracket and a flexible device detachably and adjustably connected with the upper extremities of all of the spring members, and with the said bracket of the frame work, substantially as described.

5. A harrow of the class described, composed of a number of longitudinally disposed frame bars, a number of shafts journaled in said bars and extending at right angles to the latter, the shafts being equipped with teeth, spring members having their lower extremities respectively connected with the toothed shafts, their upper extremities being slotted, a chain connected with the upper extremities of the spring members, a link of the chain engaging the slot of each spring member, and a stationary bracket mounted on one of the frame bars, with which the chain is also connected, substantially as described.

In testimony whereof I affix my signature in presence of two witnesses.

DANIEL L. POWERS.

Witnesses:
J. T. GOURLEY,
MART BRIGGS.